Oct. 2, 1945.  F. L. SPIVEY  2,386,010
POULTRY AND LIVE STOCK FEEDER
Filed Nov. 15, 1943      2 Sheets-Sheet 1
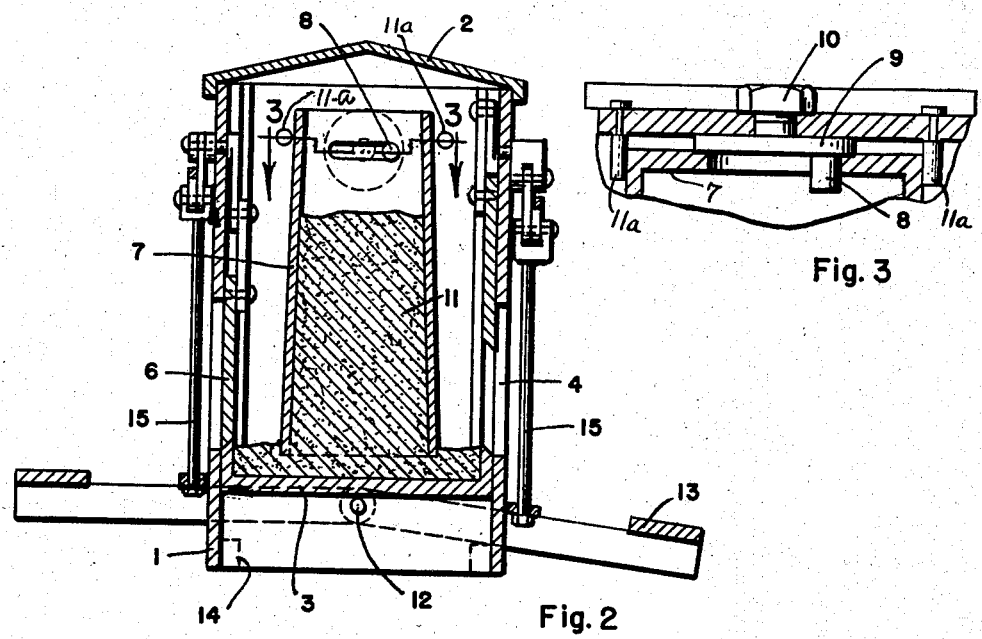
Fig. 3
Fig. 2
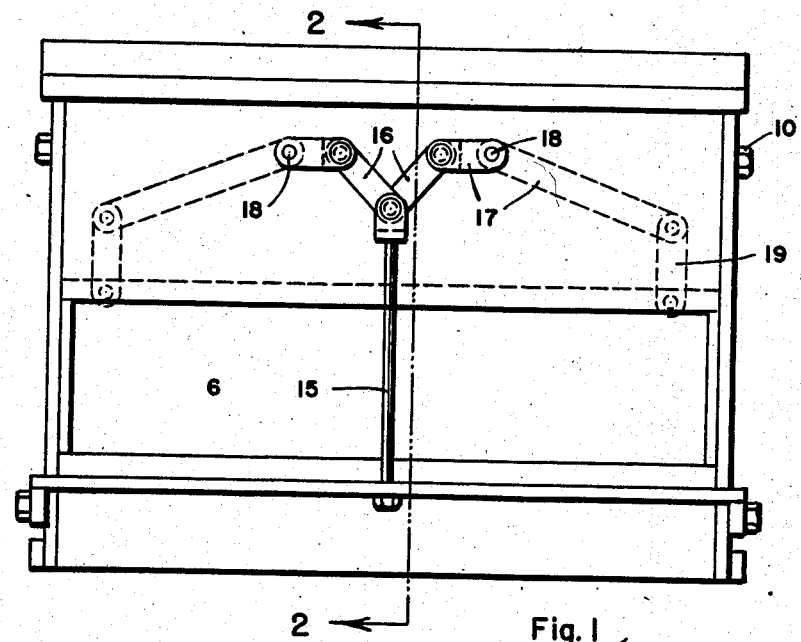
Fig. 1
Frank L. Spivey
INVENTOR.

Oct. 2, 1945.   F. L. SPIVEY   2,386,010
POULTRY AND LIVE STOCK FEEDER
Filed Nov. 15, 1943   2 Sheets-Sheet 2

Frank L. Spivey
INVENTOR.

Patented Oct. 2, 1945

2,386,010

UNITED STATES PATENT OFFICE 2,386,010

POULTRY AND LIVESTOCK FEEDER

Frank L. Spivey, San Antonio, Tex., assignor of one-half to E. C. Overall, San Antonio, Tex.; Hazel Florence Spivey administratrix of said Frank L. Spivey, deceased Application November 15, 1943, Serial No. 510,337

5 Claims. (Cl. 119—53)

My invention relates to improvements in automatic means for feeding poultry and live stock without attention by a caretaker at feeding periods.

An object of my invention is to provide protection for the feed contained in the feeder between feeding periods against waste by birds, rats, mice, and the elements as rain, dust and storm.

Another object of my invention is to provide a feeder self-operated by the particular poultry or live stock to be fed and so constructed in size and balance as to prevent other kinds and sizes of poultry or live stock not intended to be fed from getting said feed.

Another object of my invention is to provide a feeder which will prevent the poultry or animal being fed from climbing into the feed trough and contaminating the feed thereby.

Other objects of my invention will be understood from a study of the accompanying drawings and specifications in which like reference characters refer to like parts throughout the various views:

In the drawings:

Figure 1 is a side elevation of the feeder as seen from the left side of Figure 2.

Figure 2 is a vertical sectional view taken on line 2—2 of Figure 1.

Figure 3 is an enlarged fragmentary section taken on line 3—3 of Figure 2.

Figure 5:
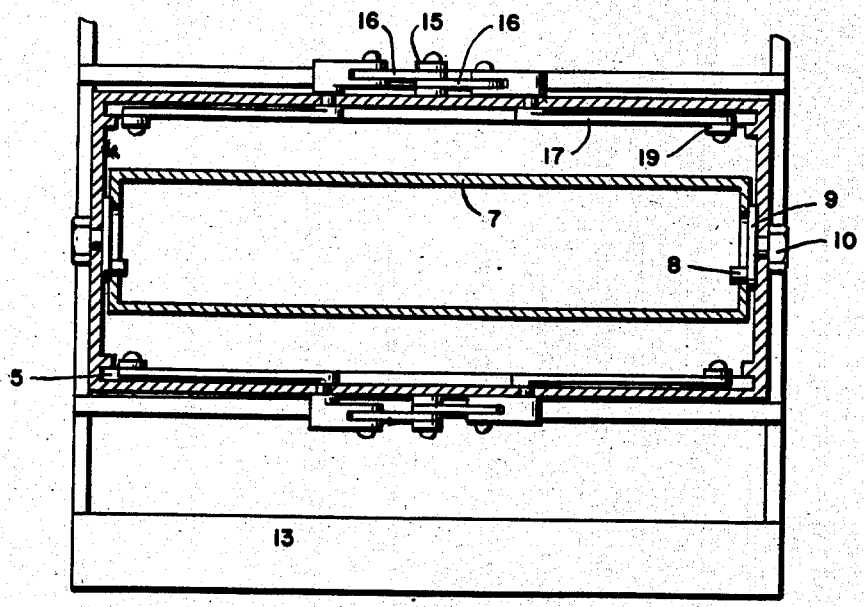
Figure 5 is a horizontal sectional view taken on line 5—5 of Figure 4.

Referring to the drawings, Figure 2, the feeder consists essentially of a housing 1, with ends extending to and forming ground bases therefor, and has a removable lid 2, and a feed trough 3 for a bottom. Said housing has feeding openings 4 above the sides of the trough. Mounted for vertical sliding movement in run-ways 5 (Figure 5) located at each end of openings 4 are doors 6 which normally close said openings by seating upon the top of the trough sides, when positioned as viewed in Figure 1, and the left hand half of Figure 2. If desired, and it is here preferred to prevent rain falling on the side of the housing from going into the feed trough 3 at the bottom of door 6, that the upper edge of the trough sides be bevelled as viewed in Figure 2, and the lower edge of the door be bevelled opposite to the bevel on the trough side. Thus constructed, when doors 6 seat on top of the trough sides, water falling on the housing cannot get into the feed trough. Mounted within housing 1 and having ends in slidable connection with said housing is a feed bin 7 seated upon adjustable pins 8 projecting from rotatable discs 9, which after adjustment are held in place by lock nuts 10. By this arrangement the feed bin may be raised or lowered relative to the feed trough 3 for regulating the rate at which the feed 11 is discharged into the feed trough. While it is not essential for successful operation of the feeder, it is preferred that the lower portion of the feed bin be of greater width than the top portion thereof to prevent wedging of feed. Centering pins 11a projecting inwardly from the ends of the housing 1 are provided in order to assure a vertical position of the feed bin 7 regardless of the positions of the pins 8 carried by the discs 9. The pins 11a are so spaced with relation to the width of the feed bin 7 that they will permit vertical movement of the feed bin but will prevent horizontal movement of the feed bin 7 when the discs 9 carrying the pins 8 are rotated.

Pivoted by pins 12 to housing ends below trough 3 are arms of foot rests 13. The downward movement of said foot rests is limited by suitable stops 14. Connected to the foot rests 13 are upwardly extending pull rods 15 provided at their upper ends with links 16 which serve to connect said pull rods 15 with the inner ends of balance levers 17 pivoted to the housing 1 by shafts 18. The outer ends of levers 17 are provided with links 19 forming the connecting medium between the outer ends of levers 17 and doors 6.

Figure 4:
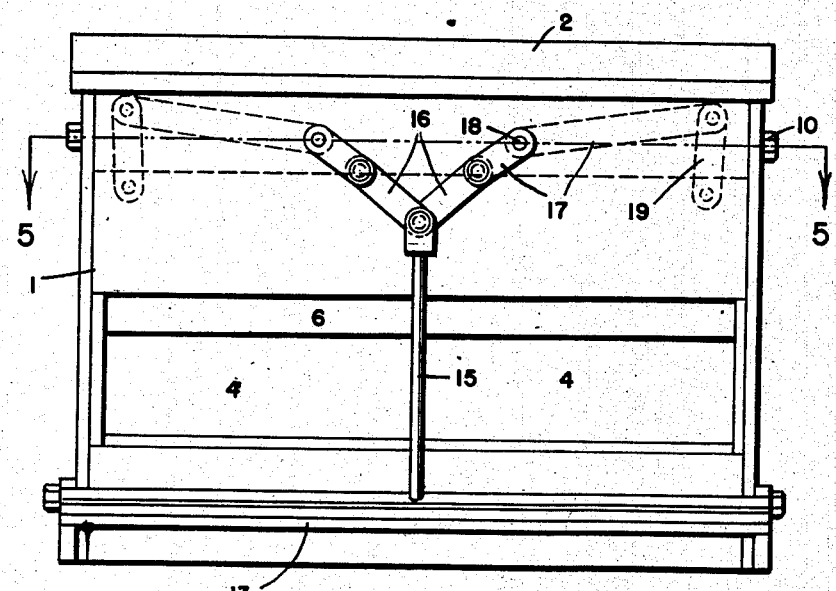
Figure 4 is a side elevation as seen from the right hand side of Figure 2.

An examination of Figures 1, 2 and 4 will disclose that when positioned for operation the weight of doors 6 will be slightly greater than the weight of the foot rests. Thus the doors 6 will seat on the trough sides while the foot rests 13 will be vertically elevated. In such position it will be noticed that a downward movement of the foot rests 13 through action of the pull rods, links and levers results in an upward movement of the doors. Attention is here invited to the fact that with various types and sizes of feeders the location of the various pivots, stops, and lengths of links, pull rods and levers will of necessity vary in accordance with individual requirements.

While the feeder has been described as a feeder from which feed may be obtained from either side it can readily be converted into a feeder from which feed is obtainable from one side only by merely disconnecting one of the pull rods 15. On which ever side the pull rod 15 is disconnected the door 6 will remain constantly in its closed position.

To operate, the feed is placed in the feed bin and then passes into the feed trough. Then in normal position as aforedescribed the poultry or animal to be fed steps upon one of the foot rests 13. The additional weight upon foot rests 13 will cause same to go downward while the doors 6 will move upward, or rise. As the feed in the trough is eaten, more feed passes from the feed bin into the feed trough. When the poultry or animal removes its weight from foot rest 13 the weight of the door being greater than the weight of the foot rest goes downward while the foot rest moves upward. The doors seat upon their trough sides in their normal positions.

It is to be understood that while a preferred form of the invention is disclosed changes may be made in various parts of the mechanism to conform to individual requirements without changing the spirit of the invention.

Having described my invention what I claim as new, and desire Letters Patent for are:

1. In combination with a housing, a feed trough within said housing, a feed bin within the housing communicating with said feed trough, stop means for adjusting and spacing the feed bin above the feed trough, openings in said housing communicating with said feed trough, vertically sliding closures mounted adjacent said openings, a removable housing lid, guide pins for positioning the feed bin walls, foot rests pivoted to the housing for limited vertical movement with relation to said housing, and link, lever and rod means connecting said vertical sliding closures and the foot rests so balanced that the closures will normally assume their down-most or closed position.

2. In combination with a housing having openings therein, a feed trough within said housing, a feed bin within and having end walls adjacent the end walls of the feed trough, adjustable stops mounted on the housing end walls and spacing the feed bin above the feed trough, and comprising guide pins for positioning the feed bin walls, vertically sliding doors mounted for closing the openings, door runways, a removable housing lid, and link, rod, lever and platform means for vertically raising said sliding doors.

3. A device of the class described and claimed in claim 2; wherein each link, rod, lever and platform means for vertically raising the sliding doors comprises a platform with arms pivoted to the housing for limited vertical movement with relation to said housing, balance levers pivoted to a housing side, links and a rod connecting a door and platform with opposite ends of the levers and so balanced that in normal position the doors will be closed and the platforms raised, and stop means for limiting downward movement of platforms.

4. A device as claimed in claim 2 wherein said feed trough has sides with the upper edges bevelled and said doors have bottom edges bevelled opposite to the level on the trough sides so that when the doors are seated a joint is made which prevents falling rain from going into the feed trough.

5. In combination with a housing, a feed trough within said housing having bevelled top sides, openings in the sides of said housing communicating with said feed trough, vertically sliding doors with bevelled bottom edges adjacent the openings, door runways, foot rests with arms pivoted to the housing ends for limited vertical movement in relation to the housing, balance levers pivoted to the sides of the housing, links connecting said vertically sliding doors with the outer ends of the balance levers, link and rod means for connecting the foot rests with the inner ends of the levers so balanced that in normal position the doors will be closed while the foot rests are raised, stops limiting downward movement of the foot rests, a feed bin wider at the bottom than at the top mounted within the housing, adjustable stops spacing the feed bin above the feed trough, and pin means positioning the walls of the feed bin, substantially as described.

FRANK L. SPIVEY.